United States Patent [19]
Leis

[11] Patent Number: 5,832,871
[45] Date of Patent: Nov. 10, 1998

[54] VIVARIUM WITH SIMPLIFIED COVER COVER RETENTION

[75] Inventor: Kenneth K Leis, Waukesha, Wis.

[73] Assignee: All-Glass Aquarium Co., Inc., Franklin, Wis.

[21] Appl. No.: 851,014

[22] Filed: May 5, 1997

[51] Int. Cl.[6] .................................................. A01K 63/00
[52] U.S. Cl. .......................................... 119/269; 119/265
[58] Field of Search ..................... 119/269, 265, 119/266, 452, 246

[56] References Cited

U.S. PATENT DOCUMENTS

| | | | |
|---|---|---|---|
| 3,721,212 | 3/1973 | Groth | 119/266 |
| 3,834,351 | 9/1974 | Schmidt | 119/266 |
| 3,913,526 | 10/1975 | Hall | 119/266 |
| 5,000,117 | 3/1991 | Gordon | 119/265 |
| 5,009,190 | 4/1991 | Gordon | 119/265 |
| 5,138,976 | 8/1992 | Gordon | 119/265 |
| 5,255,811 | 10/1993 | Simon | 119/265 |
| 5,328,049 | 7/1994 | Ritzow | 220/345 |
| 5,363,801 | 11/1994 | Watters et al. | 119/452 |
| 5,370,081 | 12/1994 | Gordon | 119/265 |

*Primary Examiner*—Michael J. Carone
*Assistant Examiner*—Yvonne R. Abbott
*Attorney, Agent, or Firm*—Andrus, Sceales, Starke & Sawall

[57] ABSTRACT

A vivarium is provided with simplified retention of a top cover. The vivarium has four sidewalls with an upper border frame that extends along the top of the sidewalls. A flange extends laterally from the upper border frame towards the interior, to provide a support surface for the top cover. Slide lock handles are slidably attached to the front edge of the top cover to make it easy to open the top cover, and for securing the top cover in a closed, locked position. The slide lock handles may be slid along the front edge of the top cover to engage the flange and lock the top cover in place. S-clamps are attached to the rear, right, and left edges of the top cover and to the flange extending from the upper border frame to secure the top cover to the vivarium.

29 Claims, 2 Drawing Sheets

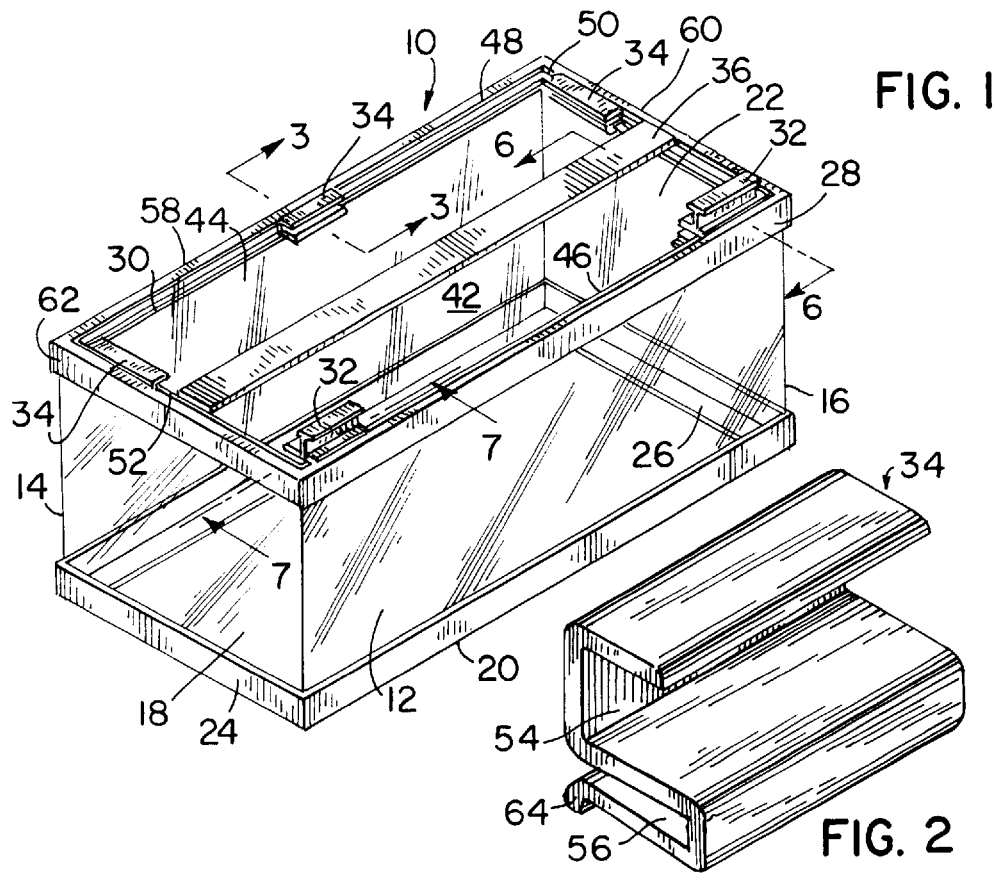
FIG. 1
FIG. 2
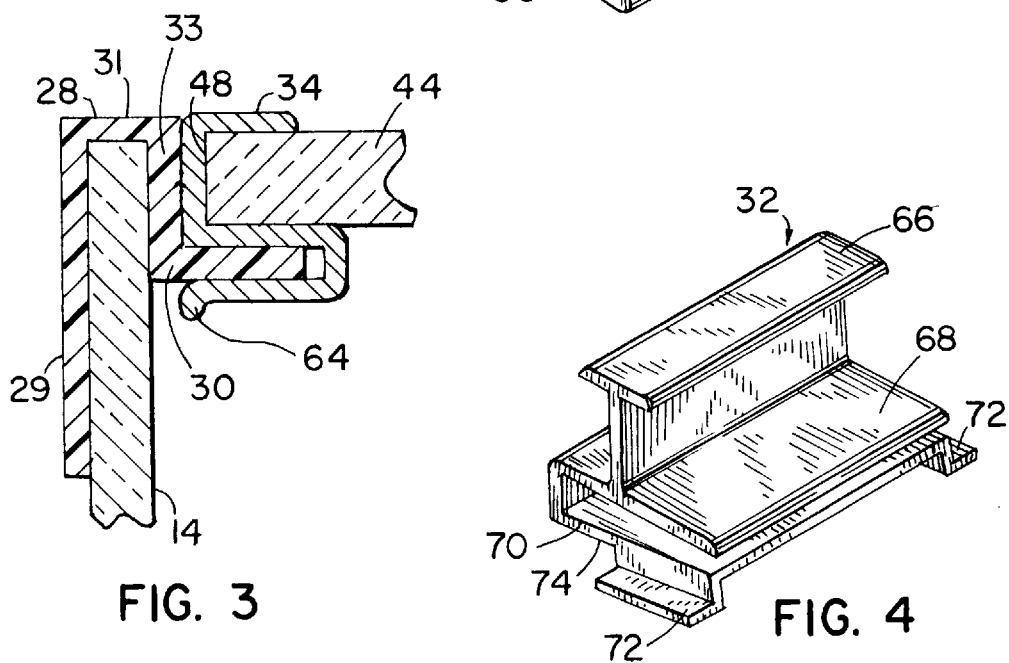
FIG. 3
FIG. 4

5,832,871

VIVARIUM WITH SIMPLIFIED COVER COVER RETENTION

BACKGROUND AND SUMMARY OF THE INVENTION

The invention relates to vivariums, including aquariums and terrariums for raising and observing animals or plants. More particularly, the invention relates to a vivarium having a removable cover with simplified retention for securing the cover to the vivarium and for opening the cover.

Vivariums, including aquariums and terrariums typically include four sidewalls, a bottom wall and a top cover for keeping and displaying animals or plants. The four sidewalls are bonded to each other and bonded to the bottom wall along their edges. The sidewalls, bottom wall and top cover are preferably made of glass but may be comprised of an acrylic plastic or plexiglass material. The vivarium has upper and lower border frames, which may be wood, plastic or metal, extending horizontally around the circumference of the vivarium and bonded thereto along the tops and bottoms of the sidewalls. The border frames, bonded to the sidewalls provide structural support and protect the edges of the sidewalls. The border frames include flanges which extend laterally horizontally inwardly from the four sidewalls. The flanges provide support surfaces for the bottom wall and top cover. The bottom wall is bonded to the top surface of the flange that extends laterally horizontally inwardly from the lower border frame. The top cover rests on the top surface of the flange that extends laterally horizontally inwardly from the upper border frame. The top cover is attached to the flange by a lock mechanism that secures the top cover to the vivarium. The top cover is easily removable to provide access to the interior of the vivarium. The top cover prevents spillage, reduces evaporation, and prevents animals from escaping. The top cover may be split into two portions and joined by a flexible plastic or vinyl hinge providing an easy-opening top. The hinged top cover allows for convenient access to the interior of the vivarium for feeding and cleaning purposes. Alternatively, the top cover may be a single portion.

In one aspect of the invention, slide lock handles are attached to the front edge of the top cover to make it easy to open the top cover, and for securing the top cover in a closed, locked position. The slide lock handles translationally slide along the front edge of the top cover. The slide lock handles have tabs that extend at opposite ends to engage the flange of the upper border frame securing the top cover to the vivarium. The slide lock handles provide two functions, first, for lifting the top cover to an open position, and second, for closing the top cover and securing it in a locked position.

In another aspect of the invention, S-clamps are attached to the rear and side portions of the top cover and to the flange that extends laterally horizontally inwardly from the upper border frame to secure the top cover to the vivarium. The upper border frame flange acts as a support surface for the top cover. The S-clamps function to hold the top cover on the top of the vivarium.

In another aspect of the invention, the top cover is split into two portions and joined by a flexible plastic or vinyl hinge to provide an easy-opening top. In this case, the top cover includes a front cover panel and a rear cover panel. The slide lock handles are attached to the front edge of the front cover panel, and the S-clamps are attached to the right, left and rear edges of the rear cover panel and to the flange that extends laterally horizontally inwardly from the upper border frame located on the rear half of the upper border frame. The hinged front cover panel may be folded back upon the rear cover panel to maintain the cover in an open position. In this fully open position, the tops of the slide lock handles rest on the top of the rear cover panel.

BRIEF DESCRIPTION OF THE DRAWINGS

FIG. 1 is a perspective view of a vivarium in accordance with the invention.

FIG. 2 is a perspective view of an S-clip in accordance with the invention.

FIG. 3 is a sectional view of the S-clip attached to the top cover and upper border frame taken along line 3—3 of FIG. 1.

FIG. 4 is a perspective view of a slide lock handle in accordance with the invention.

DETAILED DESCRIPTION OF THE INVENTION

Figure 5:
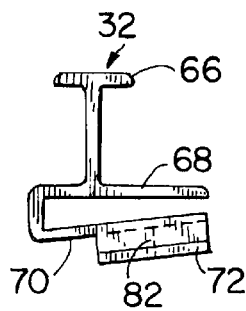
FIG. 5 is a side view of the slide lock handle of FIG. 4.

FIG. 1 shows a vivarium tank 10 for raising and observing fish, animals or plants. The tank 10 includes front sidewall 12, rear sidewall 14, right sidewall 16, left sidewall 18, bottom wall 20 and top cover 22. The front 12, rear 14, right 16 and left 18 sidewalls are bonded to each other and bonded to the bottom wall 20 along their edges with silicone glue or other suitable adhesive. The four sidewalls 12, 14, 16, 18, the bottom wall 20, and the top cover 22 are preferably made of glass but may be comprised of an acrylic plastic or plexiglass material.

The tank 10 has a lower circumferential border frame 24 that extends horizontally along the bottom of the four sidewalls 12, 14, 16, 18. The lower border frame 24 is bonded to the bottom wall 20 and the four sidewalls 12, 14, 16, 18 with an adhesive. The lower border frame 24 has a flange 26 that extends laterally horizontally inwardly from the lower border frame 24 to allow receipt of the bottom wall 20. The lower border frame flange 26 provides a support surface for the bottom wall 20. The bottom wall 20 is bonded to the top horizontal surface of the flange 26 that extends laterally horizontally inwardly from the lower border frame 24.

The tank 10 also has an upper circumferential border frame 28 that extends horizontally along the top of the four sidewalls 12, 14, 16, 18. The upper border frame 28 includes an outer leg 29, a top portion 31 and an inner leg 33. The upper border frame 28 is bonded to the four sidewalls 12, 14, 16, 18 along their top edges with an adhesive. The lower and upper border frames 24, 28 provide structural support and protect the edges of the sidewalls 12, 14, 16, 18. The lower and upper border frames 24, 28 may be made of plastic, metal or wood. The upper border frame 28 has a flange 30, FIGS. 1 and 3, that extends laterally horizontally inwardly from the upper border frame 28 to allow receipt of the top cover 22. The flange 30 extends laterally toward the interior of the tank and provides a support surface for the top cover 22.

The top cover 22 rests on the top horizontal surface of the flange 30. The top cover 22 is removably attached to the upper border frame 28 by slide lock handles 32 and S-clamps 34. The slide lock handles 32 and S-clamps 34 secure the top cover 22 to the tank 10. The slide lock handles 32 also provide a means for opening and removing the top cover 22 from the tank 10. The top cover 22 includes a flexible or living hinge 36, preferably made of plastic or vinyl, to provide easy access to the interior of the tank 10. The hinge 36 is bonded to the top cover 22 with adhesive strips 38, FIGS. 6 and 9. The top cover 22 is split into a front cover panel 42 and a rear cover panel 44. The slide lock handles 32 are attached to the front edge 46 of the front cover panel 42. The S-clamps 34 are attached to the rear edge 48, the right edge 50, and the left edge 52 of rear cover panel 44. In the case where the top cover 22 is a single portion, slide lock handles 32 or S-clamps 34 may be attached to the top cover 22 as needed for opening and securing the top cover 22 to the tank 10.

The S-clamp 34 is shown in greater detail in FIGS. 2 and 3. The S-clamp 34 is an S-shaped clamping device that removably holds the rear cover panel 44 on the upper border frame 28. The S-clamps 34 are installed on the rear 48, right 50 and left 52 edges of the rear cover panel 44. The S-clamp has a U-shaped upper opening 54 to accept and engage the rear 48, right 50 or left 52 edges of the rear cover panel 44 in horizontal sliding relation. The S-clamp has a U-shaped oppositely facing lower opening 56 which engages the flange 30 extending laterally horizontally inwardly from the rear 58, right 60 and left 62 sides of upper border frame 28 in horizontal sliding relation. The oppositely facing lower opening 56 has an entry lip 64 that extends outwardly and is curved downwardly from its bottom portion for facilitating sliding entry of flange 30 into the oppositely facing lower opening 56. The rear 48, right 50 and left 52 edges of the rear cover panel 44 mate with the upper opening 54 of S-clamp 34 in horizontal sliding relation. The flange 30 extending laterally horizontally inwardly from the rear 58, right 60 and left 62 sides of upper border frame 28 mates with the oppositely facing lower opening 56 of S-clamp 34 in horizontal sliding relation. The entry lip 64 extends outwardly and is curved downwardly from the lower oppositely facing opening 56 to make it easier to install the S-clamp 34 onto the flange 30.

The slide lock handle 32 is shown in greater detail in FIGS. 4 and 5. The slide lock handle 32 has a T-shaped handle portion 66, upper and lower clamping jaws 68 and 70, and tabs 72 extending downwardly and laterally outwardly from both sides of the lower clamping jaw 70. The slide lock handle 32 also has triangular shaped webs 82 that extend from the lower clamping jaw 70 to the tabs 72. The webs 82 provide added reinforcement and support to the tabs 72. The slide lock handles 32 are installed on the front edge 46 of the front cover panel 42. The slide lock handles 32 are removably held on the front edge 46 of the front cover panel 42 by flexibly clamping the front cover panel 42 between the slide lock handle's upper and lower clamping jaws 68 and 70, respectively. The upper and lower clamping jaws 68 and 70 flexibly accept and engage the front edge 46 of front cover panel 42.

Figure 6:
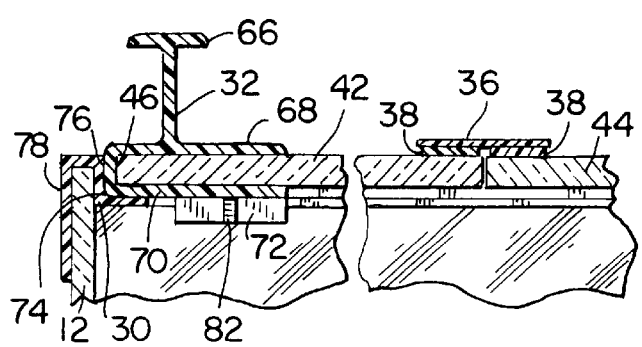
FIG. 6 is a sectional view of the slide lock handle attached to the hinged top cover taken along line 6—6 of FIG. 1.
Figure 8:
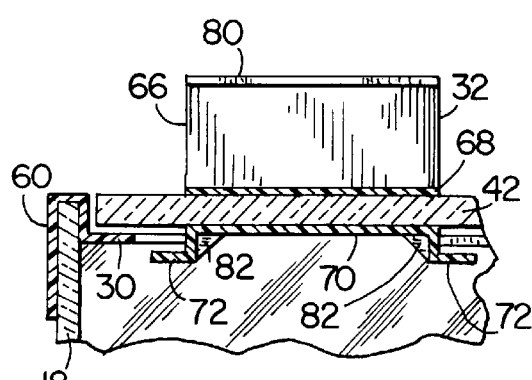
FIG. 8 is a sectional view of the slide lock handle of FIG. 7 in its unlocked position.
Figure 9:
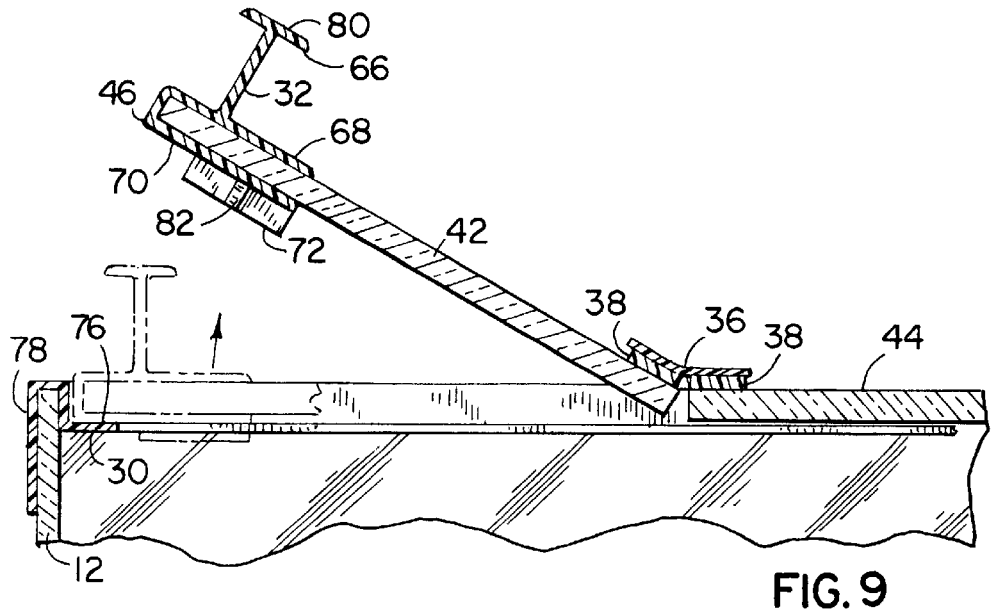
FIG. 9 illustrates opening the hinged top cover with the slide lock handle.

In the top cover's closed position, FIG. 6, the bottom horizontal surface 74 of the lower clamping jaw 70, FIGS. 4, 6 and 9, rests on top horizontal surface 76 of flange 30 extending from the front side 78 of upper border frame 28. As viewed in FIGS. 6 and 9, bottom horizontal surface 74 of lower clamping jaw 70 is horizontally laterally slidable into and out of the page along top horizontal surface 76 of flange 30. As viewed in FIGS. 7 and 8, this movement of slide lock handle 32 is left and right. The T-shaped handle portion 66 makes it easy to open and close the hinged top cover 22. The tabs 72 extend downwardly and outwardly from both sides of the lower clamping jaw 70. The slide lock handles 32 may be slid translationally along the front edge 46 of the front cover panel 42 to move the tabs 72 beneath the flange 30 of the sides 60 and 62 of the upper border frame 28, to lock the top cover 22 in place.

Figure 7:
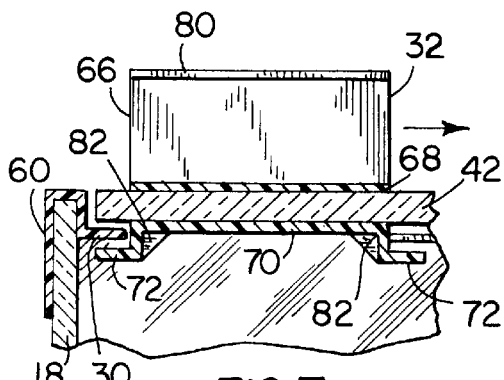
FIG. 7 is a sectional view of the slide lock handle in its locked position taken along line 7—7 of FIG. 1.

In the locked position, FIG. 7, the tabs 72 fit under the right 60 and left 62 sides of flange 30 on upper border frame 28, preventing the top cover 22 from being opened. The top cover 22 may be released from its locked position by merely sliding the slide lock handles 32 toward the center of the tank 10 as shown in FIGS. 7 and 8.

In the unlocked position, FIG. 8, the slide lock handles 32 may be used to open the front cover panel 42 by lifting up on the T-shaped handle portion 66 as shown in FIG. 9. The slide lock handles 32 may be used to lock the top cover 22 in place or to lift the front cover panel 42 open using the T-shaped handle portion 66.

In operation, the slide lock handles 32 may be slid along the front edge 46 of the front cover panel 42 to engage the downwardly and outwardly extending tabs 72 underneath flange 30 of the right 60 and left 62 sides of upper border frame 28. When the slide lock handles 32 are slid all the way over to the right and left hand sides of the front cover panel 42, FIGS. 1, 7 and 8, the tabs 72 fit underneath the flange 30 extending outwardly from the right 60 and left 62 sides of upper border frame 28, to hold the front cover panel 42 in a closed and locked position as shown in FIG. 7. To release the front cover panel 42 from its locked position, the slide lock handles 32 are slid towards the center of the tank 10 releasing the tabs 72 from underneath the flange 30 on the right 60 and left 62 sides of upper border frame 28. The front cover panel 42 may then be opened using the T-shaped handle portion 66 as shown in FIG. 9. It is possible to fold the front cover panel 42 back upon the rear cover panel 44 so that the front cover panel 42 remains open with the top portion 80 of the T-shaped handle portion 66 resting on the top of the rear cover panel 44 at the rear of the tank 10.

The S-clamps 34 hold the rear cover panel 44 on the upper border frame 28. The S-clamps are slidably mounted on the top surface of flange 30 extending laterally inwardly from the upper border frame 28, and accept and engage the rear 48, right 50 and left 52 edges of the rear cover panel 44 in horizontal sliding relation.

The top cover 22 may be removed from the tank 10 by opening the front cover panel 42 using the T-shaped handle portion 66 and sliding the top cover 22 towards the front of the tank 10. The top cover 22 should slide out of the upper opening 54 of S-clamps 34. The lower oppositely facing opening 56 of S-clamps 34 should remain engaged with the flange 30. The S-clamps 34 may then be removed from the upper border frame flange 30. The top cover 22 may be replaced on the tank 10 by sliding the rear cover panel 44 into the upper opening 54 of S-clamps 34 that are installed on the upper border frame flange 30. Various combinations of slide lock handles 32 and S-clamps 34 may be utilized on a top cover 22, depending upon the configuration of the tank 10 and the top cover 22. Configurations utilizing all slide lock handles 32, all S-clamps 34 or a combination of the two may be used.

It should be recognized that various alternatives, equivalents and modifications are possible, and that these alternatives, equivalents and modifications should be considered to be within the scope of the appended claims.

I claim:

1. A vivarium comprising:
a bottom wall;
a plurality of sidewalls, said sidewalls having an outer surface, a top edge and an inner surface;
a top cover;
an upper boarder frame extending horizontally along said sidewalls, said upper border frame having a flange extending laterally horizontally inwardly from supporting said top cover; and
at least one clamp translationally slidingly attached to at least one of said top cover and said flange for securing said top cover to said vivarium, wherein said clamp is S-shaped with a pair of openings including a U-shaped upper opening engaging said top cover and a U-shaped oppositely facing lower opening engaging said flange.

2. The invention according to claim 1 wherein said clamp further comprises an entry lip extending outwardly and curving downwardly from said oppositely facing lower opening for facilitating sliding entry of said flange into said oppositely facing lower opening.

3. The invention according to claim 1 wherein said U-shaped upper opening has a given width for slidingly flexibly engaging said top cover, and said U-shaped oppositely facing lower opening has a width less than said given width for slidingly flexibly engaging said flange.

4. The invention according to claim 1 wherein said U-shaped upper opening has a vertical outer surface, said inner leg of said upper border frame has an outer surface, and wherein said vertical outer surface of said U-shaped upper opening is substantially snug against said outer surface of said inner leg of said upper border frame.

5. The invention according to claim 1 wherein said clamp has a horizontal top surface, said top portion of said upper border frame has a horizontal top surface, and wherein said horizontal top surface of said clamp is substantially flush with said horizontal top surface of said top portion of said upper border frame.

6. The invention according to claim 1 wherein said U-shaped oppositely facing lower opening has a normal relaxed condition not engaging said flange, said U-shaped oppositely facing lower opening having an open end and a closed end, said closed end having a first width at the bight of the U, and said open end having a second width slightly less than said first width in said relaxed condition.

7. The invention according to claim 6 wherein said flange has a third width slightly greater than said second width, said flange expanding said second width when said flange is inserted into said U-shaped oppositely facing lower opening.

8. A vivarium comprising:
a bottom wall;
a plurality of sidewalls, said sidewalls having an outer surface, a top edge and an inner surface;
a top cover;
an upper border frame extending horizontally along the top of said sidewalls, said upper border frame having an outer leg, a top portion, an inner leg and a flange extending laterally from said inner leg for supporting said top cover; and
at least one clamp translationally slidingly attached to said top cover for securing said top cover to said vivarium, said clamp having a general S-shape with an upper opening and an oppositely facing lower opening, said clamp slidingly flexibly engaging said top cover in said upper opening and slidingly flexibly engaging said flange in said oppositely facing lower opening.

9. The invention according to claim 8, wherein said outer leg of said upper border frame is bonded to said outer surface of said sidewalls, said top portion of said upper border frame is bonded to said top edge of said sidewalls, and said inner leg of said upper border frame is bonded to said inner leg of said sidewalls.

10. The invention according to claim 8 wherein said clamp further comprises an entry lip extending outwardly and curving downwardly from said oppositely facing lower opening for facilitating sliding entry of said flange into said oppositely facing lower opening.

11. A vivarium comprising:
a bottom wall;
a plurality of sidewalls, said sidewalls having an outer surface, a top edge and an inner surface;
a removable top cover, said top cover having a flexible hinge separating said top cover into a front cover panel and a rear cover panel, wherein said front cover panel is foldable back onto said rear cover panel;
an upper border frame extending horizontally along said sidewalls, said upper border frame having a flange extending laterally horizontally inwardly for supporting said top cover; and
at least one clamp translationally slidingly attached to at least one of said rear cover panel and said flange for securing said rear cover panel to said vivarium.

12. The invention according to claim 11 wherein said clamp engages both said rear cover panel and said flange in translational sliding relation.

13. The invention according to claim 11 wherein said top cover is removable from said vivarium by lifting and pivoting said front cover panel about said hinge, and sliding said top cover forward releasing said rear cover panel from said clamp enabling removal of said top cover from said vivarium.

14. The invention according to claim 13 wherein said rear cover panel has a rear side, said rear cover panel having a back clamp slidably attached to said rear side, said back clamp translationally slidable along said rear side in a first direction, and said rear cover panel releasable from said back clamp in a second direction perpendicular to said first direction.

15. The invention according to claim 14 wherein said rear cover panel has a right side and a left side, said rear cover panel having right and left side clamps slidingly attached to said right and left sides, respectively, said side clamps translationally slidable along said right and left side in a second direction and said rear cover panel releasable from said side clamps in said second direction.

16. The invention according to claim 14 wherein said rear cover panel has a rear side, a right side and a left side, said rear cover panel having a back clamp and right and left side clamps slidingly attached to said rear, right and left sides, respectively, said back clamp translationally slidable along said rear side in a first direction, said side clamps translationally slidable along said right and left sides in a second direction, and said rear cover panel releasable from said back clamp in said second direction perpendicular to said first direction, and releasable from said side clamps in said second direction enabling removal of said top cover.

17. A vivarium comprising:
a bottom wall;
a plurality of sidewalls, said sidewalls having an outer surface, a top edge and an inner surface;
a top cover;
an upper border frame extending horizontally along said sidewalls, said upper border frame having a flange extending laterally horizontally inwardly for supporting said top cover; and at least one handle slidingly attached to said top cover for opening said top cover and also for securing said top cover to said tank, said handle being translationally slidable along said top cover between a first locking position and a second unlocking position, wherein said upper boarder frame extends along the top of said sidewalls and has an outer leg, a top portion and an inner leg, said flange extends laterally horizontally inwardly from said inner leg and is engaged by said handle in said first locking position, and wherein said handle has a generally U-shaped opening having an upper clamping jaw and a lower clamping jaw for engaging said top cover.

18. The invention according to claim 17 wherein said handle has tabs extending downwardly and outwardly from each side of said lower clamping jaw, said tabs moving underneath and engaging said flange when said handles are translationally slid along said top cover from said second unlocking position to said first locking position preventing said top cover from being opened, and said tabs moving away from and disengaging said flange when said handles are translationally slid along said top cover from said first locking position to said second unlocking position releasing said top cover from said upper border frame enabling opening of said top cover.

19. The invention according to claim 17 wherein said handle has a user gripable handle portion extending upwardly from said upper clamping jaw.

20. The invention according to claim 19 wherein said handle portion is generally T-shaped.

21. The invention according to claim 17 wherein said U-shaped opening has a normal relaxed condition not engaging said top cover, said U-shaped opening having an open end and a closed end, said closed end having a first width at the bight of the U, and said open end having a second width slightly less than said first width in said relaxed condition.

22. The invention according to claim 21 wherein said top cover has a third width slightly greater than said second width, said top cover expanding said second width when said top cover is inserted into said U-shaped opening.

23. A vivarium comprising:

a bottom wall;

a plurality of sidewalls, said sidewalls having an outer surface, a top edge and an inner surface;

a top cover;

an upper border frame extending horizontally along said sidewalls said upper border frame having a flange extending laterally horizontally inwardly for supporting said top cover; and at least on clamp translationally slidingly attached to at least one of said top cover and said flange for securing said top cover to said vivarium; and at least one handle slidingly attached to said top cover for opening said top cover and also for securing said top cover to said vivarium, said handle being translationally slidable along said top cover between a first locking position and a second unlocking position, wherein said clamp engages both said top cover and said flange in translational sliding relation.

24. A vivarium comprising:

a bottom wall;

a plurality of sidewalls, said sidewalls having an outer surface, a top edge and an inner surface;

a top cover;

an upper border frame extending horizontally along said sidewalls, said upper border frame having a flange extending laterally horizontally inwardly for supporting said top cover; and at least on clamp translationally slidingly attached to at least one of said top cover and said flange for securing said top cover to said vivarium; and at least one handle slidingly attached to said top cover for opening said top cover and also for securing said top cover to said vivarium, said handle being translationally slidable along said top cover between a first locking position and a second unlocking position, wherein said upper border frame extends along the top of said sidewalls and has an outer leg, a top portion and an inner leg, said flange extends laterally horizontally inwardly from said inner leg and is engaged by said clamp and is also engaged by said handle in said first locking position.

25. A vivarium comprising:

a bottom wall;

a plurality of sidewalls, said sidewalls having an outer surface, a top edge and an inner surface;

a top cover;

an upper border frame extending horizontally along said sidewalls, said upper border frame having a flange extending laterally horizontally inwardly for supporting said top cover; and at least on clamp translationally slidingly attached to at least one of said top cover and said flange for securing said top cover to said vivarium; and at least one handle slidingly attached to said top cover for opening said top cover and also for securing said top cover to said vivarium, said handle being translationally slidable along said top cover between a first locking position and a second unlocking position, wherein said clamp is generally S-shaped having an upper opening and an oppositely facing lower opening, said clamp engaging said top cover in said upper opening and engaging said flange in said oppositely facing lower opening.

26. The invention according to claim 25 wherein said clamp further comprises an entry lip extending outwardly and curving downwardly from said oppositely facing lower opening for facilitating sliding entry of said flange into said oppositely facing lower opening.

27. A vivarium comprising:

a bottom wall;

a plurality of sidewalls, said sidewalls having an outer surface, a top edge and an inner surface;

a top cover;

an upper border frame extending horizontally along said sidewalls, said upper border frame having a flange extending laterally horizontally inwardly for supporting said top cover; and at least on clamp translationally slidingly attached to at least one of said top cover and said flange for securing said top cover to said vivarium; and at least one handle slidingly attached to said top cover for opening said top cover and also for securing said top cover to said vivarium, said handle being translationally slidable along said top cover between a first locking position and a second unlocking position, wherein said handle has a generally U-shaped opening having an upper clamping jaw and a lower clamping jaw for engaging said top cover.

28. The invention according to claim 27 wherein said handle has tabs extending downwardly and outwardly from each side of said lower clamping jaw, said tabs moving underneath and engaging said flange when said handles are translationally slid along said top cover from said second unlocking position to said first locking position preventing said top cover from being opened, and said tabs moving away from and disengaging said flange when said handles are translationally slid along said top cover from said first locking position to said second unlocking position releasing said top cover from said upper border frame enabling opening of said top cover.

29. The invention according to claim 27 wherein said handle has a user gripable handle portion extending upwardly from said upper clamping jaw.

\* \* \* \* \*